(12) United States Patent
Brown

(10) Patent No.: US 7,097,877 B2
(45) Date of Patent: Aug. 29, 2006

(54) METHOD AND APPARATUS FOR LUBRICATING A TIRE

(75) Inventor: Michael Brown, Greer, SC (US)

(73) Assignee: Michelin Recherche et Technique S.A., Granges-Parcot (CH)

( * ) Notice: Subject to any disclaimer, the term of this patent is extended or adjusted under 35 U.S.C. 154(b) by 0 days.

(21) Appl. No.: 11/118,878

(22) Filed: Apr. 29, 2005

(65) Prior Publication Data

US 2005/0217778 A1    Oct. 6, 2005

Related U.S. Application Data

(63) Continuation of application No. PCT/US03/34354, filed on Oct. 28, 2003.

(60) Provisional application No. 60/422,652, filed on Oct. 31, 2002.

(51) Int. Cl.
*B05D 7/22* (2006.01)
*B05D 1/02* (2006.01)
*B05B 1/28* (2006.01)

(52) U.S. Cl. .............. 427/236; 427/427.1; 239/104; 239/154; 239/288.5; 239/532

(58) Field of Classification Search .......... 427/230, 427/236, 427.1; 152/151; 239/104, 154, 239/152, 288, 288.5, 531, 532; 118/300, 118/317
See application file for complete search history.

(56) References Cited

U.S. PATENT DOCUMENTS 4,263,953 A * 4/1981 Miceli .............. 152/158
4,430,958 A * 2/1984 Boggs .............. 118/668
4,700,890 A * 10/1987 Hasegawa ........... 239/103

* cited by examiner

*Primary Examiner*—Timothy Meeks
*Assistant Examiner*—William Phillip Flectcher, III
(74) *Attorney, Agent, or Firm*—Frank J. Campigotto; E. Martin Remick; Adam Arnold

(57) ABSTRACT

A method of lubricating the interior of a tire comprising the steps of: inserting an applicator tube including apertures and a protector sleeve between the rim and tire bead, and thereby into the interior of the tire; applying lubricant to the interior of the tire; covering the apertures with the protector sleeve; and withdrawing the applicator from the interior of the tire.

2 Claims, 1 Drawing Sheet

METHOD AND APPARATUS FOR LUBRICATING A TIRE

CROSS-REFERENCE TO RELATED APPLICATIONS

This applicaton is a continuation of PCT/US03/34354, filed Oct. 28, 2003, which claims benefit of U.S. provisional application 60/422,652, filed Oct. 31, 2002.

FIELD OF THE INVENTION

The present invention is in the field of pneumatic tires, and more specifically relates to pneumatic tires having a supporting device for bearing the load when the tire is deflated.

BACKGROUND OF THE INVENTION

Upon partial or complete deflation of a pneumatic tire, the interior surface of the tire may come into contact with the wheel, generating considerable heat that may degrade the structure of the tire. One approach to this problem has been to provide an annular insert. This annular insert, or support ring, may be a solid ring that supports the load of the wheel assembly upon deflation of the tire. However, this insert may also chafe the interior surface of the tire upon deflation, or even upon normal operation of the tire. Therefore, it has been proposed to lubricate the outer surface of the annular insert or the inner surface of the tire. However, if lubricant is incidentally placed on the tire bead, it can cause slippage of the tire on the rim. Therefore there is a need for an improved method and apparatus for placing lubricant in the interior of the tire.

SUMMARY OF THE INVENTION

The present invention is a method of lubricating the interior of tire comprising the steps of: inserting an applicator tube including apertures and a protector sleeve into the interior of the tire; applying lubricant to the interior of the tire; covering the apertures with the protector sleeve; and withdrawing the applicator from the interior of the tire. The present invention includes the lubricated tire produced by this method.

DETAILED DESCRIPTION OF THE INVENTION

The present invention is a method of lubricating the interior of tire comprising the steps of: inserting an applicator tube including apertures and a protector sleeve into the interior of the tire; applying lubricant to the interior of the tire; covering the apertures with the protector sleeve; and withdrawing the applicator from the interior of the tire. The present invention includes the lubricated tire produced by this method.

The present invention is also a method of lubricating the interior of a tire situated about a wheel assembly comprising a tire, a wheel including an annular insert on the rim of the wheel, and wherein the tire includes two beads, comprising the steps of: inserting an applicator tube including apertures and a protector sleeve between the rim and the tire bead, thereby into the interior of the tire; applying lubricant to the interior of the tire; covering the apertures with the protector sleeve; and withdrawing the applicator from the interior of the tire. The present invention includes a wheel assembly comprising a rim, an annular insert around the rim, and the lubricated tire.

Figure 1:
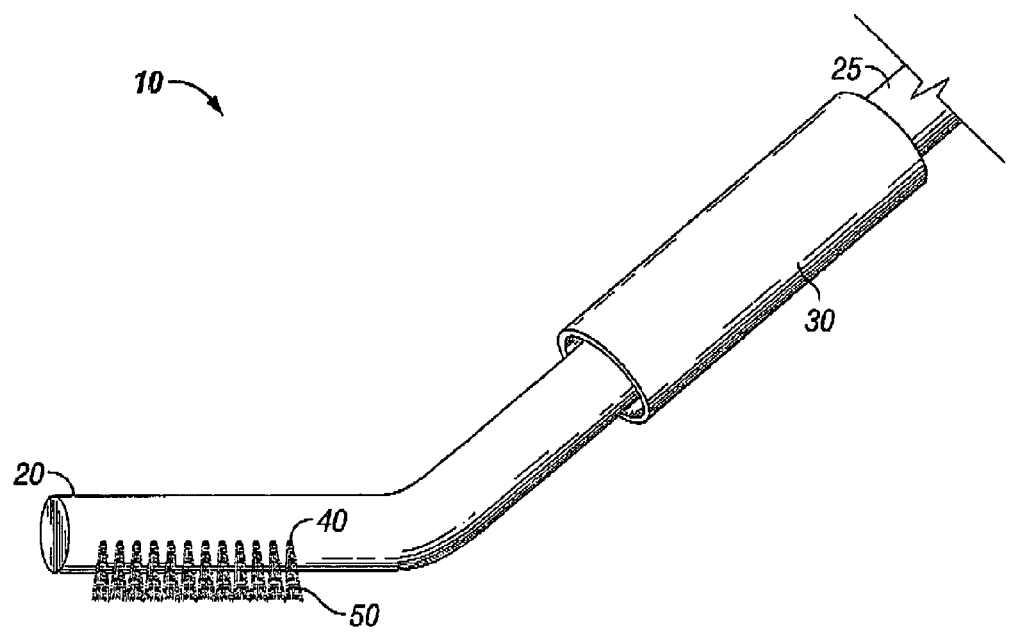
FIG. 1 illustrates the applicator tube of the present invention and its protector sleeve, and shows gel exuding from apertures in the tube.
Figure 2:
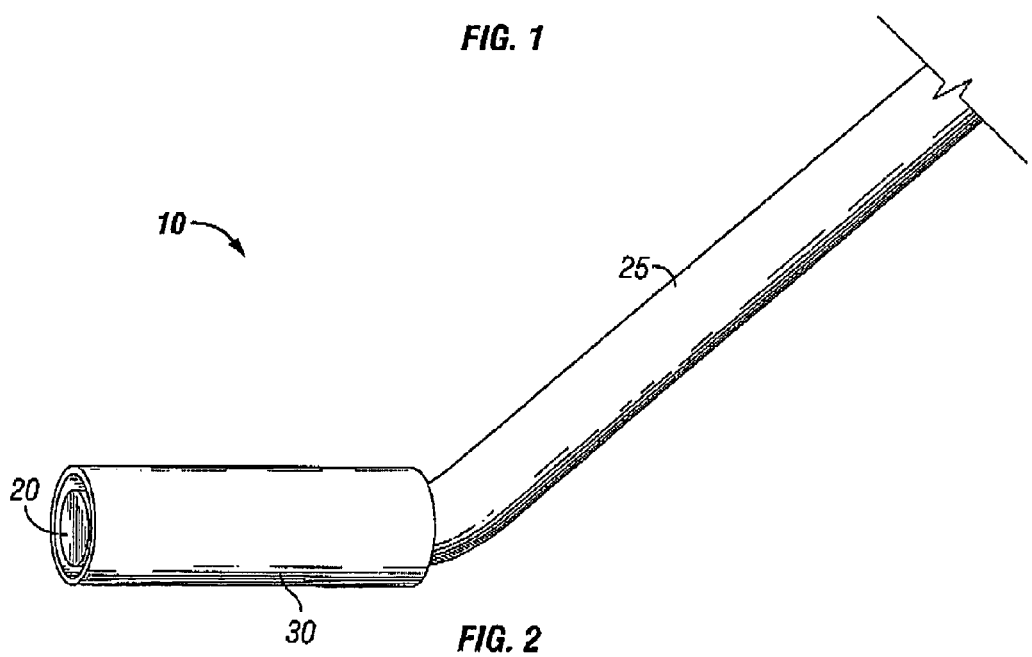
FIG. 2 illustrates the applicator tube with the apertures covered by the protector sleeve.

FIG. 1 illustrates the applicator tube (10) of the present invention. Apertures (40) in the distal end (20) of the tube permit gel (50) to be expelled from the tube. During application of the gel (50) to the interior of a tire (not shown) the protective sleeve (30) is retracted toward the proximal end (25) of the applicator tube. FIG. 2 illustrates the applicator tube (10) after the gel (50) has been applied to the interior of a tire (not shown). The protective sleeve (30) is moved from the proximal end (25) of the applicator tube (10) to the distal end (20) of the applicator tube (10) covering the apertures (40). Then the applicator tube (10) can be withdrawn from the interior of a tire (not shown), without incidental contamination of the tire bead (not shown) with gel. The applicator tube of the present invention would be mechanically connected to a reservoir of gel and a pumping mechanism for forcing the gel through the apertures. In one embodiment of the present invention, the gel could be expelled in spray form.

EXAMPLE 1

The applicator tube of the present invention was connected to an air-powered, manually operated grease gun. A wheel including an annular insert and a tire was placed on a mounting machine. Both tire beads were brought outside of their bead seats. The applicator tube was then inserted into the opening at the 6:00 position on the tire, between the rim and the bead. The distal end of the tube was held a few millimeters above the tire summit, and gel was expelled as the wheel assembly was rotated 360 degrees. After the proper amount of gel had been expelled, the protective sleeve was moved from the proximal end of the applicator tube to the distal end, covering the apertures. The applicator tube was then removed from the interior of the tire.

Variations and modifications of the present invention will be clear to one of skill in the art after reviewing the foregoing specification and drawing. These variations and modifications are meant to fall within the scope of the appended claims.

I claim:

1. A method of lubricating an interior of a tire, comprising the steps of:
    inserting an applicator tube including apertures and a protector sleeve between the rim and the tire bead, and thereby into the interior of the tire;
    applying lubricant to the interior of the tire;
    covering the apertures with the protector sleeve; and
    withdrawing the applicator from the interior of the tire.

2. A method of lubricating an interior of a tire situated about a wheel assembly comprising a tire, a wheel including an annular insert on the rim of the wheel, and wherein the tire includes two beads, the method comprising the steps of:
    inserting an applicator tube including apertures and a protector sleeve between the rim and the tire bead, and thereby into the interior of the tire;
    applying lubricant to the interior of the tire, including an inner surface of the tire, an outer surface of the annular insert or combinations thereof;
    covering the apertures with the protector sleeve; and
    withdrawing the applicator from the interior of the tire.

* * * * *